United States Patent [19]

Kabe et al.

[11] Patent Number: 4,602,666
[45] Date of Patent: Jul. 29, 1986

[54] PNEUMATIC RADIAL TIRE FOR PASSENGER VEHICLES

[75] Inventors: Kazuyuki Kabe, Hiratsuka; Tsuneo Morikawa, Hadano; Shuichi Tsukada, Hiratsuka, all of Japan

[73] Assignee: The Yokohama Rubber Co., Ltd., Tokyo, Japan

[21] Appl. No.: 744,594

[22] Filed: Jun. 14, 1985

[30] Foreign Application Priority Data

Jun. 29, 1984 [JP] Japan .................................. 59-133251

[51] Int. Cl.$^4$ .............................................. B60C 9/26
[52] U.S. Cl. ...................... 152/527; 152/529; 152/536; 152/537; 152/560
[58] Field of Search ............ 152/527, 528, 529, 536, 152/537, 560, 451

[56] References Cited

U.S. PATENT DOCUMENTS

| | | | |
|---|---|---|---|
| 3,298,417 | 1/1967 | Keefe | 152/527 |
| 3,851,692 | 12/1974 | Takemura et al. | 152/527 |
| 3,851,693 | 12/1974 | Takemura et al. | 152/527 |
| 3,881,538 | 5/1975 | Mirtain | 152/529 |
| 3,985,173 | 10/1976 | Masson | 152/529 |

Primary Examiner—Lois E. Boland
Attorney, Agent, or Firm—Armstrong, Nikaido, Marmelstein & Kubovcik

[57] ABSTRACT

A pneumatic radial tire for passenger vehicles, having a belt reinforcement layer consisting of a steel cord layer and a layer of aromatic polyamide fiber cords having its side ends bent over toward each other, wherein the layer of aromatic polyamide fiber cords is formed by embedding in covering rubber of a 100% modulus of 30 to 70 kg/cm$^2$, 40 to 70 parallel aromatic polyamide fiber cords of 0.55 to 0.65 mm in diameter per 5 cm distance in the direction at right angle to the lengthwise direction of these cords.

14 Claims, 4 Drawing Figures

PNEUMATIC RADIAL TIRE FOR PASSENGER VEHICLES

BACKGROUND

This invention relates to a pneumatic radial tire, which has a belt reinforcement layer consisting of a layer of steel cords and a layer of aromatic polyamide fiber cords having its side ends turned over toward each other, and which is characterized in that the diameter of the cords in the layer of aromatic polyamide fiber cords, the number of these cords in use and the properties of covering rubber are specifically set to thereby improve the durability of the tire, especially, the durability in bent portions of the aromatic polyamide fiber cords.

In general, conventional pneumatic radial tires for passenger vehicles have a carcass layer in which a synthetic fiber such as nylon fiber and polyester fiber is used as material for the cords therein, and a belt reinforcement layer consisting of two steel belt layers in which the cords in one layer cross those in the other. Owing to the presence of these steel belt layers, pneumatic radial tires have improved durability, high-speed stability and steering stability as compared with bias tires. However, such steel belt layers cause vibration which lessens the driving comfort.

In order to eliminate such shortcoming of pneumatic radial tires, there has of late been proposed a tire having a belt reinforcement layer, which has a steel belt layer and a layer of aromatic polyamide fiber cords having its side ends turned over toward each other and which is formed so that the cords in one layer cross those in the other (Japanese patent publication No. 53603/1983). This belt structure provides a better driving comfort than a two-layer steel belt structure, but poses a problem such that separation is liable to occur at these portions of the belt structure which are in the vicinity of the point of bending or turning of the layer of aromatic polyamide fiber cords. This problem arises due to the following facts: Whereas the strength of the aromatic polyamide fiber is very high as compared with that of conventional cord material, the crystallinity thereof is high in its molecular structure and its adhesion affinity with the covering rubber is low. Therefore, when aromatic polyamide fiber cords are used, likely is the separation, a phenomenon in which the cords and the covering rubber are separated from each other.

SUMMARY

An object of the present invention is to improve the durability of a belt reinforcement layer, and more particularly, to greatly suppress the occurrence, in a pneumatic radial tires for passenger vehicles having a belt reinforcement layer comprising a steel cord layer and a layer of aromatic polyamide fiber cords having its side ends bent or turned over toward each other, of separation likely at or about the point of bending or turning of the layer of aromatic polyamide fiber cords.

In order to achieve the object, the present invention provides a pneumatic radial tire for passenger vehicles having left and right bead portions, left and right side wall portions continuous with the bead portions, a tread positioned between the left and right side wall portions, a carcass layer provided between the left and right bead portions, and a belt reinforcement layer provided between the tread and the carcass layer, characterized in that the belt reinforcement layer consists of a steel cord layer and a layer of aromatic polyamide fiber cords bent at its both side ends, the layer of aromatic polyamide fiber cords being formed by embedding in a covering rubber of a 100% modulus of 30 to 70 kg/cm$^2$, 40 to 70 parallel aromatic polyamide fiber cords of 0.55 to 0.65 mm in diameter per 5 cm distance or width in the direction at a right angle to the lengthwise direction of cords.

The above and other objects as well as advantageous features of the invention will become apparent from the following description of the preferred embodiment taken in conjunction with the accompanying drawings.

THE DRAWINGS

THE PREFERRED EMBODIMENT

Figure 1:
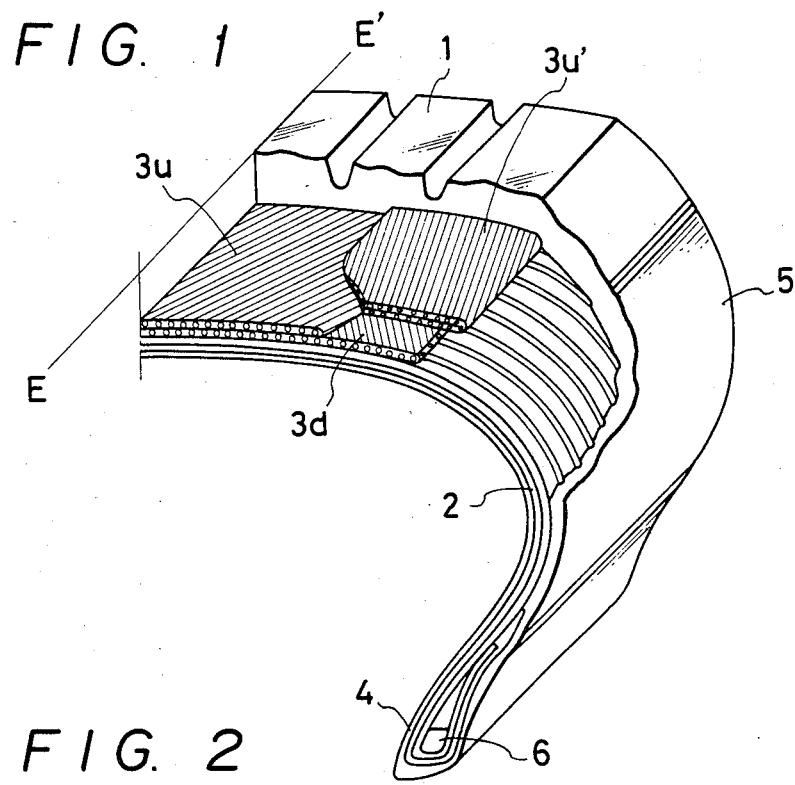
FIG. 1 is a partially cutaway perspective view of a half portion of an example of the pneumatic radial tire according to the present invention.

Referring to FIG. 1, the reference numeral 1 denotes a tread, and 2, a carcass layer provided between left and right bead portions 4 and 4. On the portion of the carcass layer which is opposed to the tread 1, a lower belt reinforcement layer 3d consisting of steel cords and an upper belt reinforcement layer 3u consisting of aromatic polyamide fiber cords are provided so as to cover the outer circumferential surface of the mentioned portion of the carcass layer 2. The reference numeral 3u' denotes a bent- or folded-over portion of the upper belt reinforcement layer 3u, and 5 and 5, left and right side wall portions joined to the left and right bead portions 4 and 4. The carcass layer 2 is folded back around bead wires 6 in the bead portions 4. The line E—E' denotes the circumferential direction of the tire.

Each cord in the carcass layer 2 consists of a synthetic fiber, such as fiber of nylon, rayon and polyester. These fibers usually have a strength around 5 to 10 g/d.

According to the present invention, as mentioned above the belt reinforcement layer consists of a steel cord layer and a layer of aromatic polyamide fiber cords folded over at its both side ends. In this embodiment, a steel cord layer is shown as the lower belt reinforcement layer 3d but it may not necessarily be laid on the lower side, and it may be laid either on the upper side or on the lower side. One or more steel cord layers may be provided. Also, the layer of aromatic polyamide fiber cords may not necessarily be laid on top. It may be laid on the bottom and bent over at its both side end portions so as to wrap a steel cord layer laid on top thereof. Each steel cord in the steel cord layer preferably consists of a steel wire having a carbon content of 0.62 to 0.87% and a tensile strength of not less than 250 kg/mm$^2$. As a secondary reinforcement layer for these belt reinforcement layers a layer formed by arranging nylon cords parallel with one another in the circumferential direction of the tire may be laid on the upper belt reinforcement layer 3u. (1) For purposes of the present invention, the aromatic polyamide fiber cord in the layer of aromatic polyamide fiber cords is obtained by twisting aromatic polyamide fibers which have properties including a tensile strength of not less than 150 kg/mm² and a modulus of tensile elasticity of not less than 3000 kg/mm², in a manner such that the twist constant K expressed by the formula, $K = T\sqrt{D}$, wherein T is the number of twists of the cord (turns/10 cm) and D is the total denier value, is within a range of $1500 \leq K \leq 3500$, and thereafter subjecting the resulting twisted fibers to bonding and heat treatment.

To be ideal in order to obtain an improvement in or relating to the resistance to bending fatigue, the twist constant K is $2800 \leq K \leq 3400$.

This aromatic polyamide fiber cord is superior with respect to the tensile strength as shown in the following table to synthetic fibers such as nylon fiber, rayon fiber and polyester fiber which are conventionally used as material for carcass cords.

|  | Aromatic polyamide fiber | Polyester | 6(6—6) nylon | Rayon |
|---|---|---|---|---|
| Tensile Strength (yarn) | 22 g/d | 9 g/d | 9 g/d | 6 g/d |

(2) The aromatic polyamide fiber cord has a diameter of 0.55 to 0.65 mm for purposes of the present invention.

The aromatic polyamide fiber cords of a smaller diameter serve more effectively to improve the durability of the tire. However, the rigidity per unit weight of the belt reinforcement layer cannot be set at too low a level for keeping the strength of this layer sufficiently high. Accordingly, the diameter of these cords is naturally limited.

In connection with tires different in the cord diameter [but the (tensile) rigidity per unit width of the tire in the lengthwise direction of the cords is substantially constant], indoor durability tests were conducted.

The tests were carried out using tires of 195/70 HR14 and rims of $5\frac{1}{2}JJ \times 14$, at an air pressure of 2.1 kg/cm² and a speed of 80 km/hr, on a drum of diameter of 1707 mm, at an initial load of 525 kg, which was increased by 50 kg every two hours.

Figure 2:
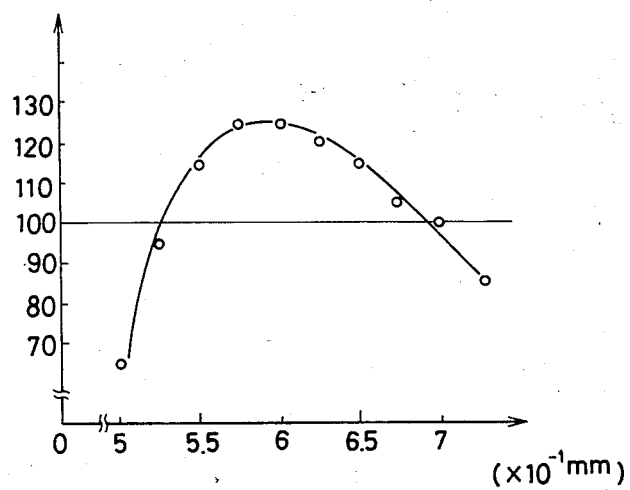
FIG. 2 is a graph showing the relation between the diameter of an aromatic polyamide fiber cord and the durability thereof.

The test results are shown in FIG. 2, in which the abscissa represents the diameter of cords and the ordinate, the durability of tires (expressed by indexes). It is understood from FIG. 2 that a high durability of the tire of 100 or above is obtained within the range of the cord diameter of from 0.55 to 0.65 mm. Especially, when the diameter of the cords is from 0.58 to 0.63 mm, the durability thereof is markedly improved. It is understood that the cords of a diameter within this range have a durability of not less than 110 (index), which is remarkably higher than the tire durability value of a cord of 0.7 mm in diameter employed as a conventional tire cord. The diameter of cords was measured in accordance with JIS L-1017. (3) The covering rubber used to embed aromatic polyamide fiber cords therein has a 100% modulus of 30 to 70 kg/cm² according to the invention.

When the 100% modulus of the rubber is less than 30 kg/cm², the durability of the carcass layer decreases since the modulus of aromatic polyamide fiber cords is high. On the other hand, if the 100% modulus of the covering rubber exceeds 70 kg/cm², the rubber becomes too hard, so that productivity is decreased. (4) According to the present invention, 40 to 70 aromatic polyamide fiber cords per 5 cm distance in the direction at a right angle to the lengthwise direction thereof are embedded in parallel with one another in the covering rubber to form a layer of aromatic polyamide fiber cords in the belt reinforcement layer. Reasons why this layer is formed in the above-mentioned manner are as follows.

Figure 3:
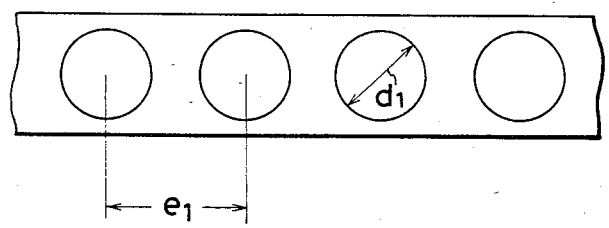
FIG. 3 is a sectional view of a belt reinforcement layer in a conventional tire.
Figure 4:
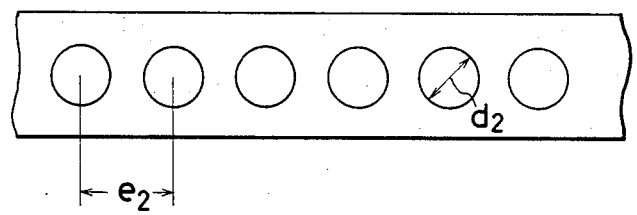
FIG. 4 is a sectional view of a layer of aromatic polyamide fiber cords in the belt reinforcement layer in the tire according to the present invention.

With reference to FIGS. 3 and 4 which, respectively representing a conventional structure and a structure according to the present invention, respectively show a cross section of cords in the belt reinforcement layer, a consideration will be entered into the rigidity of cords against bending deformation at the time when the tire undergoes a bending deformation, particularly when it is rotated in contact with a ground surface (if this rigidity is higher, separation tends to more easily take place at the ends of cords). When the distance between the center line of a cord and the outer surface thereof is long, a large strain occurs easily on the same surface.

The rigidity D is generally expressed as a product of the multiplication of the moment I of inertia of area by the tensile rigidity E.

$$D = E\, I_n \quad (E_1 = E_2 = E \text{ in the case of same material}) \quad (1)$$

wherein n is the number of cord ends.

In the case of the cord shown in FIG. 3, $I_1 = \pi d_1^4/64$, and in the case of the cord shown in FIG. 4, $$I_2 = \pi d_2^4/64 \quad (2)$$

Supposing numbers of these cords (number of cords per unit width) to be $n_1$ and $n_2$, the intervals $e_1$ and $e_2$ can be expressed as follows:

$$e_1 = 1/n_1,\ e_2 = 1/n_2 \quad (3)$$

If the tensile rigidity in the lengthwise direction of each of the cords shown in FIGS. 3 and 4 per unit width is constant, $$E\, A_1 n_1 = E\, A_2 n_2$$

wherein $A_1 = \pi d_1^2/4$ and $A_2 = \pi d_2^2/4$. Therefore, the following equation can be established.

$$d_1^2 n_1 = d_2^2 n_2 \text{ or } n_2/n_1 = (d_1/d_2)^2 \quad (4)$$

Now, supposing the ratio of the rigidity of a cord shown in FIG. 3 to that of a cord shown in FIG. 4 this m can be determined by the following formula (5):

$$m = \frac{D_2}{D_1} = \frac{E\, I_2 n_2}{E\, I_1 n_1} = \frac{I_2 n_2}{I_1 n_1} = \frac{\frac{\pi d_2^4}{64} n_2}{\frac{\pi d_1^4}{64} n_1} = \left(\frac{d_2}{d_1}\right)^4 \frac{n_2}{n_1} \quad (5)$$

$$= \left(\frac{d_2}{d_1}\right)^4 \left(\frac{d_1}{d_2}\right)^2 = \left(\frac{d_2}{d_1}\right)^2$$

Namely, even when the tensile rigidity of a cord is set to the same level, the rigidity (an index representing the degree of readiness of occurrence of separation) can be varied. Accordingly, if $d_2 < d_1$, this ratio can be reduced to thereby minimize the possibility of occurrence of separation. However, there naturally is a limit to the reduction of the diameter of the cords. In other words, when friction occurs among the cords embedded parallel with one another, the cords would be broken.

In order to solve this problem, the number of cords used in the present invention is limited to 40 to 70 per width or distance of 5 cm in the direction at a right angle to the lengthwise direction thereof. When this number is less than 40, the covering rubber is liable to flow from positions among the cords to decrease the rigidity of the belt reinforcement layer. When the number of cords exceeds 70, the flow of the rubber among the cords is adversely affected to cause a decrease in the bonding strength thereof. As a result, the durability of the belt reinforcement layer decreases, and the cost of manufacturing tires increases greatly. Thus, arranging 45 to 65 cords per the mentioned distance or width proves to be most effective.

According to the present invention described above, the belt reinforcement layer is formed of a steel cord layer and a layer of aromatic polyamide fiber cords having its both side ends bent or turned over toward each other, and this layer bent at both side ends is formed by embedding in a covering rubber of a 100% modulus of 30 to 70 kg/cm², 40 to 70 parallel aromatic polyamide fiber cords of 0.55 to 0.65 mm in diameter per 5 cm width in the direction at right angles to the lengthwise direction of the cords. Therefore, the durability of the tire, especially, the durability at the bent or folded-over portions of the layer of aromatic polyamide fiber cords can be improved.

The present invention is not, of course, limited to the above embodiment, which may be modified in various ways within the scope of the appended claims.

What is claimed is:

1. A pneumatic radial tire for passenger vehicles, having left and right bead portions, left and right side wall portions continuous with said bead portions, a tread positioned between said left and right side wall portions, a carcass layer provided between said left and right bead portions, and a belt reinforcement layer provided between said tread and said carcass layer, characterized in that said belt reinforcement layer consists of a steel cord layer and a layer of aromatic polyamide fiber cords having its side ends turned over toward each other, said layer of aromatic polyamide fiber cords being formed by embedding in a covering rubber of a 100% modulus of 30 to 70 kg/cm², 40 to 70 parallel aromatic polyamide fiber cords of 0.55 to 0.65 mm in diameter per width or distance of 5 cm in the direction at right angles to the lengthwise direction of said cords.

2. A pneumatic radial tire according to claim 1, wherein said belt reinforcement layer consists of a steel cord layer laid on the upper side, and a layer of aromatic polyamide fiber cords laid on the lower side, said layer on the lower side being bent at its both side end portions so as to wrap said layer on the upper side.

3. A pneumatic radial tire according to claim 1, wherein each steel cord in said steel cord layer consists of a steel wire having a carbon content of 0.62 to 0.87% and a tensile strength of not less than 250 kg/mm².

4. A pneumatic radial tire according to claim 2, wherein each steel cord in said steel cord layer consists of a steel wire having a carcon content of 0.62 to 0.87% and a tensile strength of not less than 250 kg/mm².

5. A pneumatic radial tire according to claim 1, wherein the aromatic polyamide fiber cord in said layer of aromatic polyamide fiber cords is formed by twisting an aromatic polyamide fiber which has properties including a tensile strength of not less than 150 kg/mm² and a modulus of tensile elasticity of not less than 3000 kg/mm², in a manner such that a value within a range of $1500 \leq K \leq 3500$ is obtained of the twist constant K expressed by the formula, $K = T\sqrt{D}$, wherein T is the number of twists of said cord (turns/10 cm) and D is the total denier of said cord, and thereafter subjecting the resulting twisted fiber to bonding and thermal treatment.

6. A pneumatic radial tire according to claim 2, wherein the aromatic polyamide fiber cord in said layer of aromatic polyamide fiber cords is formed by twisting an aromatic polyamide fiber which has properties including a tensile strength of not less than 150 kg/mm² and a modulus of tensile elasticity of not less than 3000 kg/mm², in a manner such that a value within a range of $1500 \leq K \leq 3500$ is obtained of the twist constant K expressed by the formula, $K = T\sqrt{D}$, wherein T is the number of twists of said cord (turns/10 cm) and D is the total denier of said cord, and thereafter subjecting the resulting twisted fiber to bonding and thermal treatment.

7. A pneumatic radial tire according to claim 5, wherein said twist constant K is within a range of $2800 \leq K \leq 3400$.

8. A pneumatic radial tire according to claim 6, wherein said twist constant K is within a range of $2800 \leq K \leq 3400$.

9. A pneumatic radial tire according to claim 1, wherein the diameter of each cord in said layer of aromatic polyamide fiber cords is 0.58 to 0.63 mm.

10. A pneumatic radial tire according to claim 2, wherein the diameter of each cord in said layer of aromatic polyamide fiber cords is 0.58 to 0.63 mm.

11. A pneumatic radial tire according to claim 5, wherein the diameter of each cord in said layer of aromatic polyamide fiber cords is 0.58 to 0.63 mm.

12. A pneumatic radial tire according to claim 6, wherein the diameter of each cord in said layer of aromatic polyamide fiber cords is 0.58 to 0.63 mm.

13. A pneumatic radial tire according to claim 7, wherein the diameter of each cord in said layer of aromatic polyamide fiber cords is 0.58 to 0.63 mm.

14. A pneumatic radial tire according to claim 8, wherein the diameter of each cord in said layer of aromatic polyamide fiber cords is 0.58 to 0.63 mm.

* * * * *